United States Patent [19]

McNeely et al.

[11] 4,443,027
[45] Apr. 17, 1984

[54] MULTIPLE COMPANY CREDIT CARD SYSTEM

[76] Inventors: Maurice G. McNeely, 250 Ohua Ave., Apt. 8C, Honolulu, Hi. 96815; Rodney A. Gomes, 1760 Hookupa St., Pearl City, Hi. 96782

[21] Appl. No.: 287,980

[22] Filed: Jul. 29, 1981

[51] Int. Cl.³ .......................................... B42D 15/00
[52] U.S. Cl. ...................................... 283/83; 283/904; 283/77; 283/98; 235/487; 235/492; 235/494; 40/625
[58] Field of Search ...................... 40/2.2, 625; 283/7, 283/83; 235/487, 492

[56] References Cited

U.S. PATENT DOCUMENTS

| | | | |
|---|---|---|---|
| 3,376,661 | 4/1968 | Hulett | 40/2.2 |
| 3,399,473 | 9/1968 | Jaffe | 40/2.2 |
| 3,533,176 | 10/1970 | Weitzberg et al. | 40/2.2 |
| 3,732,640 | 5/1973 | Changnon | 40/2.2 |
| 3,876,865 | 4/1975 | Bliss | 40/2.2 |
| 3,967,400 | 7/1976 | Otto | 40/2.2 |
| 4,017,834 | 4/1977 | Cuttill | 283/83 |
| 4,079,883 | 3/1978 | Calder | 40/2.2 |
| 4,222,516 | 9/1980 | Badet et al. | 235/492 |

*Primary Examiner*—Gene Mancene
*Assistant Examiner*—Wenceslao J. Contreras
*Attorney, Agent, or Firm*—James Creighton Wray

[57] ABSTRACT

One or more miniaturized credit indicators are affixed to a wallet-size primary plate bearing the name, signature, picture and account number of an authorized user. Each of the indicators represent a different credit account. The indicators are locked into recessed spaces on the face of the plate. Magnetic tapes, microprocessor chips or integrated circuits imbedded in the indicators and plate provide identifying information. Means are provided for reading and decoding information stored in the plate or indicator.

5 Claims, 3 Drawing Figures

MULTIPLE COMPANY CREDIT CARD SYSTEM

BACKGROUND OF THE INVENTION

Today's typical consumer relies on credit cards issued by banks, oil companies and other credit extenders to transact much of his daily business. Although such credit cards offer quick, reliable means of establishing a consumer's worthiness to purchase goods and services on credit, they have drawbacks.

A single credit card is light, compact and convenient. However, five, six, seven or more are bulky, clumsy and inconvenient for storage in a pocket, wallet or purse.

If a single credit card is lost or stolen, its authorized user is required only to contact one issuer to cancel or suspend the authorization of future credit extensions in his name. However, if five, six, seven or more cards are lost or stolen at the same time, their authorized user is required to contact each and every issuer individually to cancel or suspend the authorization of future credit extensions in his name. This process can be both costly and time-consuming.

A multiple-company credit-card system, based on the issuance of a primary plate to each participating credit-card user, would provide all of the benefits of an assortment of individual credit cards while eliminating the above-named drawbacks.

DESCRIPTION OF THE PRIOR ART

The following prior art known to the inventor is considered most relevant:

U.S. Pat. No. 3,921,318 which shows a medical history card the size of a standard credit card containing a portion with one or more connected microfilm frames of a self-proofed medical history. The card frame has an opaque area printed with visible indicia such as the identification of the person and critical medical data taken from the medical history pages. A magnetic tape is added for storing machine-readable information.

U.S. Pat. No. 3,512,130 which shows a master credit card for a multiplicity of companies. It is a continuation-in-part of U.S. Pat. No. 3,376,661 described below. The credit card in this invention has an encoded account number thereon for use in receiving credit from a plurality of different creditors. The invention includes means for comparing the encoded account number on the card with a plurality of account numbers and signaling the presence of the encoded account number among the plurality of account numbers.

U.S. Pat. No. 3,376,661 which shows a multiple company credit card and system for use in receiving credit from a plurality of different creditors. The cards contain the card holder's identity on one portion and on the other portion a predetermined pattern of creditor indicia, with each indicia identifying a different creditor and occupying a predetermined position in the pattern. The system also includes read-out means arranged to receive a card and to sense and display a predetermined one of the indicia.

The following U.S. Pat. Nos. disclose cards having chips or integrated circuits embedded therein: 3,816,711; 3,868,057; 3,873,975; 3,872,438; 3,876,865; 3,906,460; 4,001,550; 4,004,133; 4,013,894; 4,105,156; 4,222,516 and 4,224,666.

Additional prior art U.S. Pat. Nos. known to the inventor, but considered less relevant are: 4,066,873; 3,876,484; 3,792,542; 3,363,346 and 2,225,297.

SUMMARY OF THE INVENTION

This invention relates to providing a multiple-company credit-card system which permits the issuance of a primary plate to each participating credit-card user and eliminates the need of each participating user to own an assortment of credit cards.

This invention also provides a multiple-company credit card system which tailors the credit authorizations represented on the primary plate to the credit preferences, requirements and qualifications of each individual, participating credit-card user.

This invention further provides a multiple-company credit card system which has the flexibility to permit each participating credit-card user to add or subtract credit authorizations without replacing the personally-tailored primary plate.

This invention still further provides a multiple-company credit card system which enables each participating credit-card user to cancel or suspend the authorization of credit extensions based on credit cards represented on his primary plate by writing a single letter or placing a single telephone call to the primary plate issuer.

This invention further relates to a multiple-company credit card system which distributes to merchants and service providers who honor primary plates, means to enlarge, decipher, decode or interpret credit-card information reduced in size, encoded or conveyed by esoteric markings on each primary plate.

Objects of the invention are, therefore, to provide an improved credit card system and to provide a credit card system which eliminates the need to carry an assortment of wallet-size cards or plates.

These and other and further objects and features of the invention are apparent in the disclosure which includes the above and below specification and claims and drawings.

DESCRIPTION OF THE PREFERRED EMBODIMENTS

Figure 1:
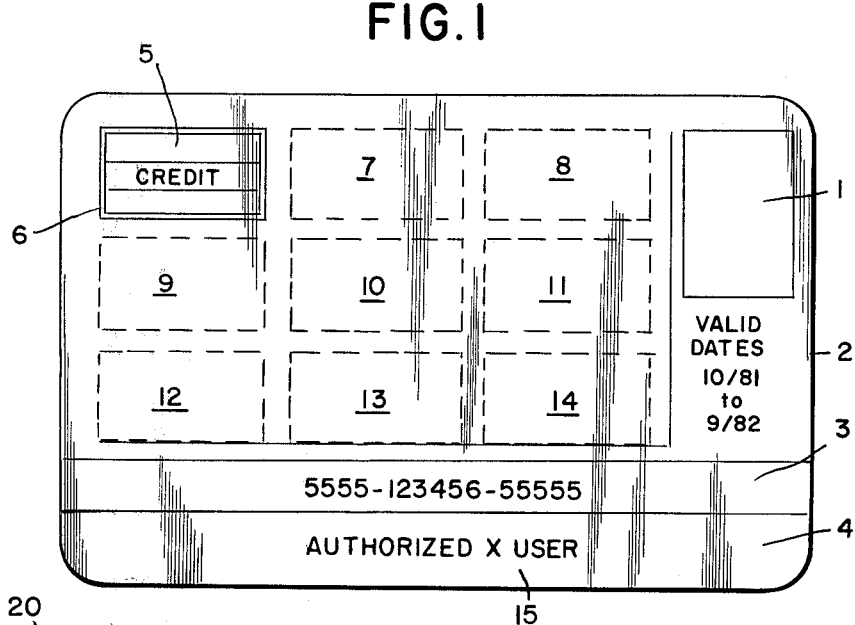
FIG. 1 shows a frontal view of a primary plate with one miniature credit card inserted and with room for eight more credit cards, in accordance with an embodiment of the invention.

This invention is particularly concerned with providing a multiple-company credit-card system which enables participating credit-card users to eliminate the necessity of owning or carrying a bulky, inconvenient stack of credit-cards issued by individual banks, oil companies, department stores or other credit extenders.

In the system, each participating credit-card user is issued a primary or master plate of a size suitable for wallet storage. On it are displayed means of identifying the authorized user and means of determining banks, oil companies and/or other credit sources which have extended the user credit.

The drawing shows a frontal view of a preferred embodiment of the primary plate on which the multiple-company credit-card system is based.

On the primary plate's front surface, a photograph of the authorized card user 1 may be embedded, and the dates of the plate's validity 2 indicated.

Provision is made for inclusion of the authorized user's account number 3 and name 15. On the reverse side (not shown), a blank space suitable for receiving the authorized user's signature is provided. A miniature credit indicator 5 is shown locked into place in a cut-out space 6 the same size as cut-out spaces 7-14. Additional miniature credit indicators can be locked into spaces 7-14. A preferred form of miniature credit indicator is a reduced size reproduction of a credit-card issued to the authorized user by a credit-granting establishment.

A blank space 4 suitable for affixation of the authorized user's signature is also provided.

Although some or all of the information on the plate is not necessarily decipherable without special viewing equipment or interpretable without special decoding equipment, the preferred embodiment of the primary plate used in the system provides information which readily identifies the authorized credit-card user without the aid of additional equipment. The preferred embodiment also provides coded information identifying the authorized user in the form of a strip of magnetic tape, not shown, embedded within the plate, capable of recording coded information, or some other embedded coded means for identifying the authorized user and/or providing authorization information to a business establishment to which the card is presented for use.

Figure 3:
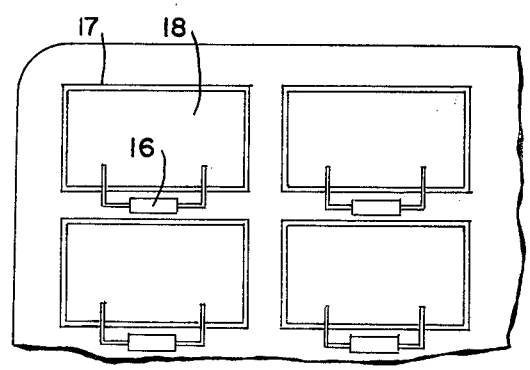
FIG. 3 is a fragmentary frontal view of a primary plate in accordance with yet another embodiment of the invention.

In the alternate embodiment, shown in FIG. 3, information for identifying the authorized credit-card user or providing credit authorization comprises a microprocessor, computer or integrated circuit chip 16 embedded in the plate. Preferably, chips 16 are provided adjacent each of the cut-out spaces 17 and are adapted to interact or coordinate with information stored on the indicators 18 locked into those spaces 17. The chips 16 can be used alone or in combination with one or more of the above-mentioned identification means.

To render the primary plate useless to unauthorized users, other embodiments bear user or credit-card identification means which are only discernible with special viewing, decoding or interpreting equipment. Because the unauthorized user of a lost or stolen primary plate cannot determine the identity of the authorized user without the use of special equipment, such user is unlikely to know which merchants or service providers will honor the plate or what supportive identification they will require.

In other simpler embodiments, the system's primary plate displays only the signature of the authorized user, the account number of the authorized user, one or more photographs of the authorized user, or in combination of two or more of the above-mentioned identification means. Such embodiments may or may not also display embossed or printed dates indicating the term of the plate's validity.

In the preferred embodiment, nine spaces 6-14, shown in the drawing, are cut into three rows of three spaces each. Into each of these spaces one miniature credit-card or credit-card facsimile can be inserted to signify the primary plate user's eligibility for credit extensions from its issuer.

In alternate embodiments, spaces may range in number from 2 to 50. However, there are typically 6 to 18 spaces and there are preferably 9 to 15 spaces. Embodiments displaying greater numbers of credit-cards or credit-card facsimiles require that the cards themselves and the spaces on the plate into which they fit be made smaller.

In a preferred embodiment, miniature credit-card 5 is a small, plastic plate bordered by tiny perforations which facilitate its being snapped into cut-our space 6.

In similar, alternate embodiments, a miniature credit-card or credit-card facsimile may take the form of:

A. a paper stamp laminated to the front surface of the primary plate;
B. a thin, plastic or plastic-like film or paper stamp whose underside is coated with an adhesive and which fits into a solid, slightly recessed space on the front of the primary plate;
C. a small, plastic or plastic-like plate which is slightly larger than the cut-out space into which it fits and which is inserted into pairs of slits extending from two opposing sides or all four sides of each space on the flexible primary plate;
D. a small, plastic or plastic-like plate whose curved, scalloped or jagged border interlocks with the complimentarily curved, scalloped or jagged border of the space into which it fits;
E. a paper or cardboard stamp which is inserted into a pocket formed of small sheets of transparent material which are sealed to front and back surfaces of the plate and overlap the die-cut space on the plate;
F. a paper or cardboard stamp which is slipped behind a sheet of transparent plastic or similar material which is sealed over the front surface of a solid, slightly recesses space on three or four sides.

Figure 2:
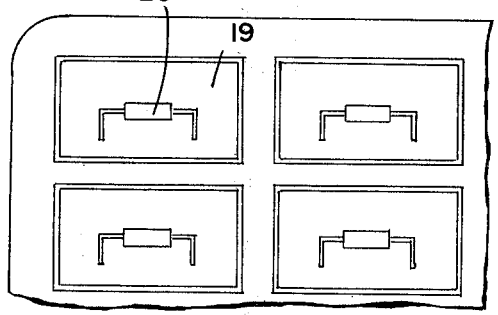
FIG. 2 is a fragmentary frontal view of a primary plate in accordance with an alternative embodiment of the invention.

In an alternative embodiment, shown in FIG. 2, credit indicators 19 containing microprocessor, computer or integrated circuit chips 20 or magnetic tapes take the place of miniaturized credit-cards or credit-card facsimiles. The chips 20 provide information signals, for example, signals identifying the authorized user or the issuing creditor.

If desired, the chips 16 and 20 can be used together to interact and coordinate with each other. For example, the chip 20 in the indicator representing a particular creditor could differ from the chips 20 in the indicators representing other creditors. Each of the chips 16 in a given master plate would differ in a similar manner. A credit authorization signal would be given only when the indicators were placed in the proper cut-out to match the chips 16 and 20. The possibility of successful unauthorized duplication of a card system could thus be reduced. As another example, each indicator issued to a given master plate holder could have the same chip 20, which chips 20 would be identical to the chips 16 in that person's master plate. An authorization signal would be given only if the chips 16 and 20 matched. Use of an indicator by a master plate owner other than the authorized users of the indicator could thus be prevented.

In another embodiment of the invention, there is provided a single credit card having a single computer chip embedded therein. In addition to the function performed by the chips 20, such a computer chip could store information each time the cardholder engaged in a credit transaction. Information such as date, place and amount of purchase and the nature of the goods or services purchased could be stored. The cardholder could read out the stored information using compatible decoding or reading equipment to provide himself with an accounting of all his credit transactions.

Merchants and service providers who honor the primary plate are supplied with appropriate equipment means to enlarge, decode, translate or interpret the specific credit-source identification and user identification means, e.g., a magnifying viewer or a computer terminal, such means to be used operatively with said primary plate.

Although the primary plate used in the system may be of any suitable size, it is preferably small enough to fit inside a wallet, pocket or purse. Typically, the card will be from 1.75 to 2.5 inches on one side and from 3 to 3.75 inches on the other.

Although the plate is preferably made of a plastic or plastic-like material, metal or any other suitable, thin material can be used in its place.

Although some embodiments require that certain modifications, i.e., additions or deletions of credit-cards represented on a primary plate, be made by the primary-plate issuer, other embodiments can be modified by the primary-plate user itself.

Without trading one's plate or requesting a replacement, the user can request, either from the primary-plate issuer or the issuers of individual credit cards, appropriate miniaturized credit-cards or credit-card facsimiles which the user can self-attach, insert or apply to the primary plate. In this manner, one can personally tailor a card to fit one's own temporary or permanent credit needs and qualifications.

In those embodiments which require the user to exchange a plate or request a replacement to add or delete credit cards represented on it, the user still reserves the privilege of tailoring the plate to fit the user's own credit needs because only those credit extension authorizations which the user requests and for which the user qualifies are represented on the user's primary plate.

Although, in a preferred embodiment, only one authorized user can make use of a primary plate, in other embodiments, auxiliary plates are issued to family members, employees or other individuals for whom the primary-plate user agrees to assume credit liability. Such auxiliary plates may or may not display a photograph or photographs of the authorized auxiliary plate user or users.

All embodiments have in common means to facilitate simultaneous cancellation or temporary suspension of all future credit extensions based on credit cards represented on the primary plate. Thus, a primary-plate user can be absolved of credit obligations resulting from future, unauthorized credit transactions based on cards represented on the user's plate by making a single telephone call or mailing a single letter to the primary-plate issuer to request cancellation or temporary suspension of credit authorizations. The primary-plate issuer then, in turn, assumes the responsibility for advising all credit-card issuers represented on the plate that it has been lost or stolen.

While the invention has been described with reference to specific embodiments, the exact nature and scope of the invention is defined in the following claims.

What is claimed is:

1. A multiple-company credit card system comprising (a) a primary identification plate containing legible means for identifying an authorized user, and coded means for identifying said user, plural solid, slightly recessed spaces on a front of the primary plate for affixation of a plurality of miniature credit indicators, and plural primary plate microcircuit chip coding means embedded in the primary plate adjacent the recessed spaces, the primary plate chip coding means having interconnection means extending into the recessed spaces for connecting with credit indicators mounted in the recessed spaces, and (b) at least one miniature credit indicator having an upper side comprising a miniature reproduction of a credit card issued to an authorized user by a credit-granting establishment, each indicator having an underside with an adhesive means for attaching the indicator to one of the slightly recessed spaces in the primary plate, and a microcircuit chip embedded in each miniature credit indicator, the credit indicator microcircuit chips being adapted to interconnect with microcircuit chips embedded in the primary plate, each of the miniature indicators being provided with a microcircuit chip which is different from a microcircuit chip in any other miniature indicator.

2. The system of claim 1 further comprising means for a business establishment to decode any coded information contained in the primary plate, and in circuit chip coding means in any miniature credit indicators affixed thereto, and means to read the legible information contained thereon, all said means used operatively with said primary plate.

3. The system of claims 1 or 2 wherein the primary plate provides for the affixation of from 6 to 18 miniature credit indicators with separate chip coding means.

4. The system of claim 3 wherein the primary plate contains the name and a photograph of the authorized user; legible dates defining the plate's term of validity; a legible account number assigned to the user; and a blank space suitable for affixation of the authorized user's signature.

5. A multiple-company credit card system comprising a primary identification plate containing legible means for identifying an authorized user, a coded means for identifying the user and having recesses set into a front face of the primary plate for affixation of a plurality of miniature credit cards, a plurality of chips embedded in the primary plate adjacent the recesses and having means for connecting each of the chips to each of the recesses, a plurality of miniature credit cards having adhesive means on undersides thereof for affixation of the miniature credit cards in the recesses, and each of the miniature credit cards having a chip which is different from any chip in another miniature credit card and means for severally connecting the credit card chips with the chips embedded in the primary plate to provide information signals.

* * * * *